(12) United States Patent
Wa et al.

(10) Patent No.: US 8,911,845 B1
(45) Date of Patent: Dec. 16, 2014

(54) ANTI-COUNTERFEITING MECHANISM FOR A TOY HOUSING

(76) Inventors: Choi Man Wa, Fanling (HK); Lam Kin Ming Clement, Sai Kung (HK)

(*) Notice: Subject to any disclaimer, the term of this patent is extended or adjusted under 35 U.S.C. 154(b) by 555 days.

(21) Appl. No.: 12/971,126

(22) Filed: Dec. 17, 2010

(51) Int. Cl.
- *B32B 3/00* (2006.01)
- *B29C 33/40* (2006.01)
- *A63H 33/00* (2006.01)

(52) U.S. Cl.
USPC .................. 428/36.92; 264/219; 446/491

(58) Field of Classification Search
USPC .......................................... 428/36.92; 283/72
See application file for complete search history.

(56) References Cited

U.S. PATENT DOCUMENTS

| | | | | |
|---|---|---|---|---|
| 6,069,955 A | * | 5/2000 | Coppersmith et al. | 380/54 |
| 6,357,799 B1 | * | 3/2002 | Shibata et al. | 283/91 |
| D587,323 S | * | 2/2009 | McKinney | D21/589 |
| 2003/0146288 A1 | * | 8/2003 | Berson | 235/494 |
| 2008/0297852 A1 | * | 12/2008 | Fan et al. | 358/3.28 |
| 2009/0061177 A1 | * | 3/2009 | Kriha et al. | 428/209 |

FOREIGN PATENT DOCUMENTS

JP    2008259854 A   * 10/2008

* cited by examiner

*Primary Examiner* — Gwendolyn Blackwell
*Assistant Examiner* — Susan R Dye
(74) *Attorney, Agent, or Firm* — Andrew S. Langsam; Pryor Cashman LLP

(57) ABSTRACT

A counterfeit-resistant toy housing is provided having a repetitive pattern formed into at least a portion of at least one toy housing surface. The pattern preferably includes first and second regions intertwined with and visibly different from each other. The first region may have a different elevation than the second region, or a different finish, or both. A photoetching chemical is applied to at least a portion of a metal mold, and at least a part of the mold is covered with a cover having a light-transmissible first region and an opaque second region, the first and second regions forming a first design. Light is projected upon the covered metal mold, thereby eroding a section of the mold underneath the first region and forming a first design in the mold. The photoetching steps are repeated to provide different layers. The toy housing component is molded from the patterned mold.

1 Claim, 8 Drawing Sheets

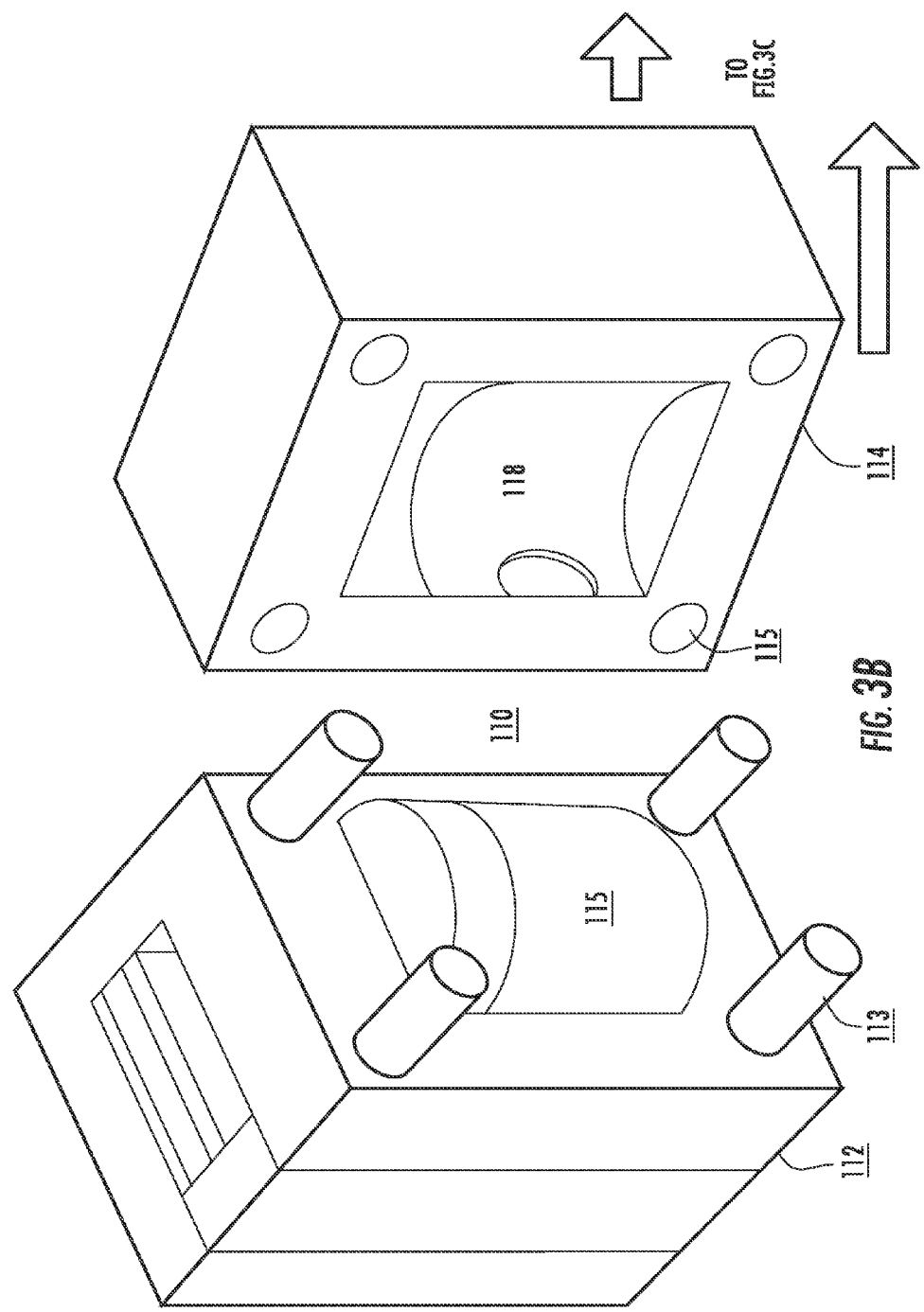

ANTI-COUNTERFEITING MECHANISM FOR A TOY HOUSING

BACKGROUND OF THE INVENTION

1. Field of the Invention

The invention relates most generally to toys, and more specifically to the plastic housing of most toys, such as handheld video games, windup toys, jacks-in-the-box, and the like. Most specifically, the invention relates to structures and methods of providing brand name recognition in as many places as possible on a toy without interfering with the functioning of the toy or the enjoyment thereof.

2. Description of Related Art

Toys have been in existence for centuries and made from a variety of materials. Within the last several decades, toys have become increasingly made from inexpensive materials such as plastics. Because plastics are very easily manufactured and manipulated into any form via a number of methods, e.g., blow molding, extruding, etc., not only is it typically easy to make toys, it is also easy to make counterfeit toys. The contours of a housing for a toy can easily be scanned or reverse molded to form the patterns for knockoff goods. While the original manufacturer provides the original design work, advertising, and enthusiasm for the toy and its goodwill, an unscrupulous counterfeiter can copy it and ride on the coattails of the original manufacturer's success.

Accordingly, there is a long-felt need to provide an inexpensive way to readily identify the legitimate manufacturer of a toy while making it more difficult for a potential counterfeiter to copy the toy. It is also highly desirable to provide a distinctive and recognizable housing for a toy to increase the identifiability of source and quality and a mechanism which will easily and quickly allow the manufacturer and the authorities to identify counterfeit products. It is additionally desirable to provide a distinctive and striking "look" for a toy housing to foster the goodwill of the manufacturer and highlight brand awareness with the purchasing public.

SUMMARY OF THE INVENTION

The invention is a counterfeit-resistant toy housing in which at least one toy housing surface has a repetitive pattern formed into at least a portion of the otherwise flat surface. The pattern preferably includes a first region and a second region intertwined with and visibly different from the first region. The first region may have a different elevation than the second region, or a different finish, or both. The patterned surface can be an outer surface to readily identify the source of the toy, an inner surface to provide secret counterfeit protection, or both. If both surfaces are provided with patterns, they may be provided with different patterns. Multiple surfaces of the same toy can each have a distinct pattern on the outside or inside surfaces.

The housing material is made from conventional plastics such as polyethylene, polypropylene, polystyrene, polyvinyl chloride, polycarbonate, and the like. A distinctive, repetitive pattern is formed on at least one side of the housing. Preferably, the pattern is a repeating pattern, possibly one or more tessellations. More preferably, the pattern is formed (e.g., by photochemical etching or laser-etching of the metal mold, or by a similar process) onto at least the side of the housing that faces the exterior of the toy so that the pattern is visible to a user. Most preferably, the pattern includes at least two regions: a first smooth or glossy region, and a second rougher or matte-finish region. The pattern is ideally provided over most or all of the outer surface of the housing of the toy.

Optionally, the same or a different pattern is provided on at least a portion of the inner surface of the housing to serve as a hidden anti-counterfeiting mechanism.

Another aspect of the invention is a method of manufacturing a counterfeit-resistant toy housing. First, a metal mold is provided in which a plastic toy housing component having a pattern is to be formed. A photo-sensitive erosion chemical is applied to at least a portion of the metal mold. The chemical causes erosion of the metal mold when subjected to a predetermined form of light such as ultraviolet light. At least a part of the chemically-treated portion of the metal mold is covered with a first cover having a first region adapted to be light transmissible to the predetermined form of light and a second region adapted to be opaque to the predetermined form of light. The first and second regions preferably form a first design. The predetermined form of light is projected upon the covered metal mold, thereby eroding a section of the mold underneath the first region and forming the first design in the metal mold. When the pattern is finished being made in the metal mold, the plastic toy housing component is formed using the patterned metal mold.

Preferably, prior to molding the toy housing component, the photochemical etching steps are repeated using a second cover having a third region adapted to be light transmissible to the predetermined form of light and a fourth region adapted to be opaque to the predetermined form of light. The third and fourth regions preferably form a second design, thereby forming a second additive pattern on the metal mold. In one embodiment, the first design is formed in the metal mold with a different depth than the second design formed in the metal mold by performing the respective light projecting steps for different periods of time, thereby giving the photo-sensitive erosion chemical more or less time to act on the metal mold. In addition or in the alternative, a second, different photo-sensitive erosion chemical, having different reactivity properties than the first photo-sensitive erosion chemical, can be used in the second round of etching so that the first design formed in the metal mold has a different depth than the second design formed in the metal mold owing to one of the erosion chemicals working more efficaciously than the other.

In addition or in the alternative to repeating the photochemical etching steps, the invention includes using a photoresist cover having not only a first transparent region and a second opaque region but also a third region adapted to be partially light transmissible to the predetermined form of light, the third region forming a second design. If some but not all of the predetermined form of light passes through the third region of the cover, the second design will be etched into the metal mold at a different depth than the first design formed in the metal mold. As another option, again, used either in addition to or in the alternative to any of the above aspects of photochemical etching, different wavelengths of light may be used during different iterations of the process if it is repeated, or the photoresist cover can be provided with multiple regions having differing light transmissibility properties for differing wavelengths of light.

By providing a pattern of this nature, several benefits are provided. First, the variegated topology of the outer surface of the toy makes the toy more easily held and less likely to be dropped and broken by small careless hands. Second, it provides a very visually appealing aesthetic to portions of a toy that are typically ignored in that regard, e.g., the bottom and rear surfaces of the housing where little or none of the "action" occurs. Third, the pattern makes the toy difficult to counterfeit. Were deep ridges and high peaks provided on the surface of the toy, such topology is readily mimicked by others. However, the typical depth of a photochemically etched mold pattern can be smaller than a thousandth of an inch, difficult to copy by conventional copying methods, yet, still provide a visually discernible and easily recognizable pattern. Typical attempts to copy such a housing will result in gaps in the pattern, or a failure to realize the proper finish (glossy or matte) in certain portions, or other extremely visible defects. Put simply, the effort required to counterfeit a toy with the inventive housing is so great and requires such a sophisticated technique that it is likely to be too expensive to be worthwhile for would-be copyists. Finally, the etched pattern itself can include the name of the toy, the name of the manufacturer, or a trademark, or other distinctive pattern, so as to provide a tremendous amount of brand recognition for the product in a manner more subtle and elegant than simply plastering removable stickers or the like all over the toy.

BRIEF DESCRIPTION OF THE DRAWINGS

FIGS. 3A-F are a series of schematic perspective views of a method of making a piece of patterned plastic in accordance with the invention.

DETAILED DESCRIPTION OF THE INVENTION AND DRAWINGS

Description will now be given with reference to the attached FIGS. 1-3. It should be understood that these figures are exemplary in nature and in no way serve to limit the scope of the invention which is defined by the claims appearing hereinbelow.

Figure 1:
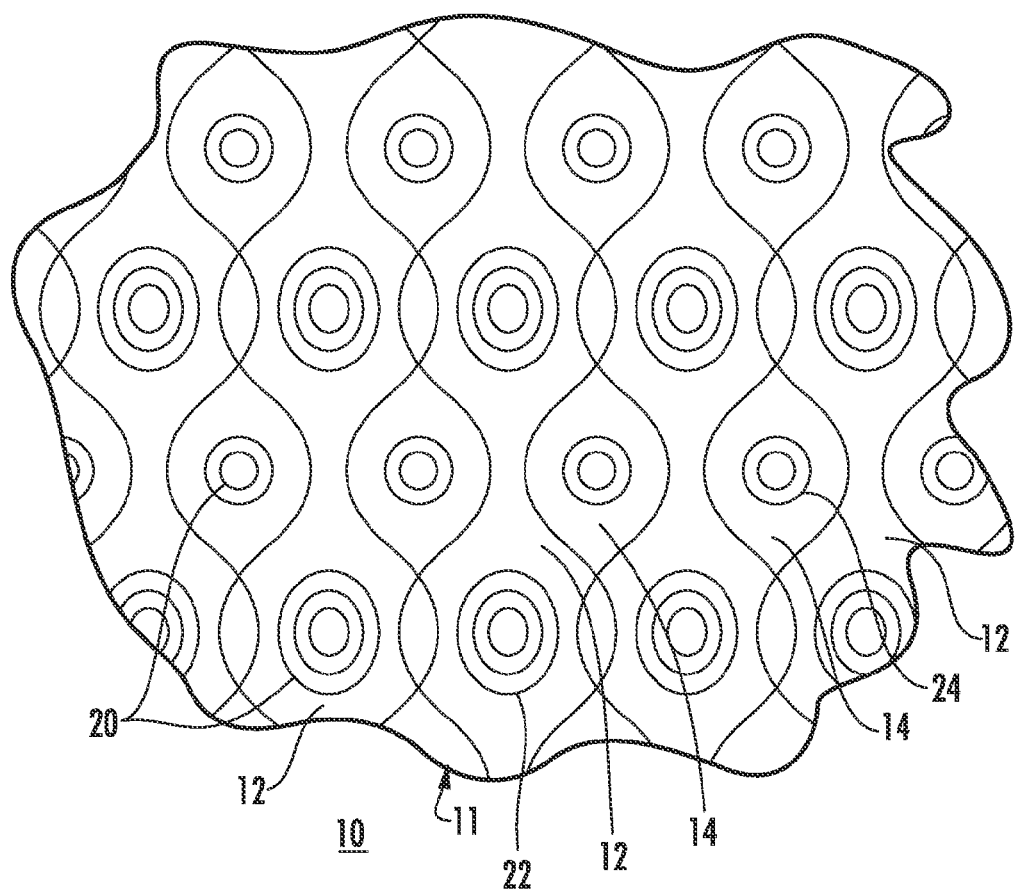
FIG. 1 is a plan view of a piece of a patterned plastic toy housing in accordance with the invention.

FIG. 1 depicts a substantially planar piece of patterned plastic 10 bearing a repeating pattern 11. In the preferred embodiment, pattern 11 consists of two regions, first region 12 and second region 14. It is preferred to make regions 12 and 14 intertwined or co-mingled, yet, give regions 12 and 14 differing characteristics, such as different elevations, different reflective properties or finishes (e.g., glossy versus matte finishes), or the like. More preferably, each region includes at least one element 20 of the opposite style therewithin. So, for example, if region 12 is made with a matte finish, it is provided with a glossy element 22 within the border of region 12. Similarly, if region 14 is made with a glossy finish, it is provided with a matte element 24 within the border of region 14. Elements 22 and 24 may include multiple zones, such as the bull's eye configuration shown in FIG. 1, with alternating rings of different finishes, elevations, or the like. Other configurations are also contemplated. In the preferred embodiment, the toy housing outer surface is provided with a large area of repeated regions 12 and 14, each having different elevations and/or surface finishes, yet they are integrated into the overall surface area so as to provide a large tessellating pattern.

Figure 2:
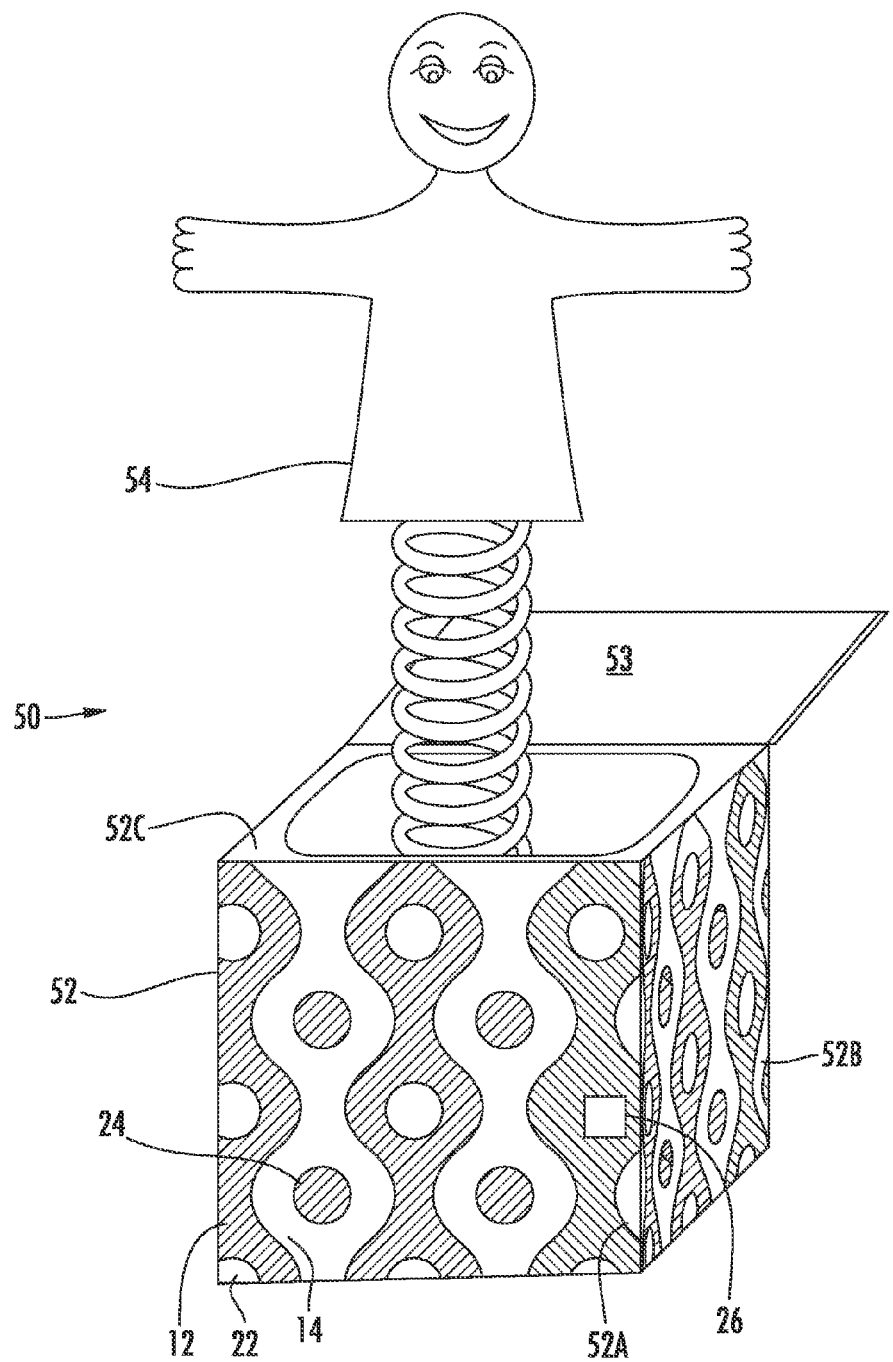
FIG. 2 is a perspective view of a representative toy incorporating patterned plastic as part of its housing in accordance with the invention.

FIG. 2 shows a toy 50, in this case, a jack-in-the-box, having the inventive housing described above. Here, toy 50 includes a main housing 52. Outer housing walls 52A and 52B are made of plastic 10 having etched pattern 11 extending substantially over its surface. Internal top surface 52C may be but need not be provided with the pattern 11, since surface 52C is only visible when cover 53 is open and toy puppet 54 is outside the housing. Optionally, the inner surfaces (not shown) of main housing 52 may be provided with a pattern, either the same pattern 11 as formed on the outer surfaces or a different pattern. While surfaces 52A and 52B are shown having the same pattern, it is within the scope of the invention to provide different or coordinated (but not identical) patterns on different surfaces of the housing.

As an additional possible anti-counterfeiting measure, while the repeating patterns are shown in FIG. 1 as being consistent throughout the entire patterned portion of the housing, it is also contemplated to add a single (or a small number of) different design element in the pattern that may not be immediately apparent to the casual viewer but could be known to and readily identifiable by the original manufacturer. As an example, in FIG. 2, regions 12 and 14 are provided with round elements 22 and 24, respectively, nearly all over the patterned region of the housing, except for one square element 26 on the lower right side of surface 52A.

How the multi-layer or multi-textured pattern is formed in the plastic toy housing is shown in FIGS. 3A-F. The process involves repetitive use of photolithography or photochemical etching of the metal mold in which the plastic housing components are to be made. Photolithography is conventionally used to form single layer patterns on metal and semiconductor substrates coated with photoresist, resulting in selective developing of the photo-resist, when exposed to ultraviolet light through a photomask. The substrate is then etched, during which process the developed photoresist serves as a barrier against the etchant, resulting in only the selected area being etched.

Figure 3A:
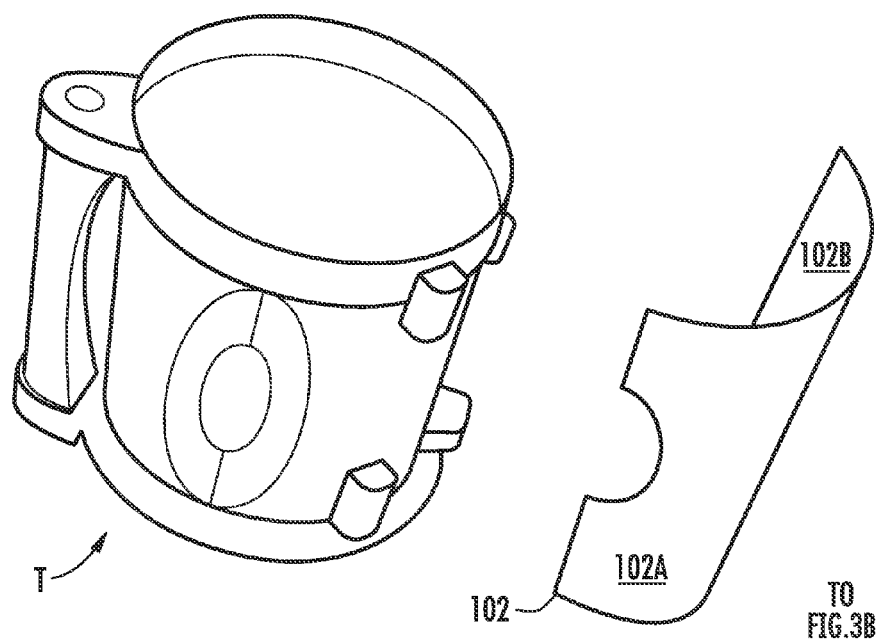

The process as it applies to the instant invention is depicted schematically in FIGS. 3A-F. First, as shown in FIG. 3A, toy T is designed having a plastic housing component 102, including an outer surface 102A and an inner surface 102B. As shown in FIG. 3A, housing component 102 is not flat but curvilinear, since toy T is a drum. Of course, housing component 102 can be flat, curved, or any shape and still be provided with the inventive patterning. This is because, as shown in FIG. 3B, a metal mold 110 is created to form plastic housing component 102. Metal mold 110 has, like many molds, a male mold portion 112 and a female mold portion 114. Pins or projections 113 are preferably provided on one of the mold portions 112 and 114, corresponding to and matingly engageable with recesses 115 formed in the other of the mold portions 112 and 114. Male mold portion 112 includes working surface 116, which corresponds to plastic housing component inner surface 102B, and female mold portion 114 includes working surface 118, which corresponds to plastic housing component outer surface 102A. Thus, if a pattern is to be provided on housing component outer surface 102A, it must be formed on working surface 118, and if a pattern is to be provided on housing component inner surface 102B, it must be formed on working surface 116.

FIGS. 3C-F depict how the patterns are formed in the metal mold 110, e.g., by photochemical etching. In these figures, only female mold portion 114 is shown, however the invention contemplates and includes male mold portion 112 being provided with an etched pattern either in addition to or in the alternative to female mold portion 114.

Figure 3C:
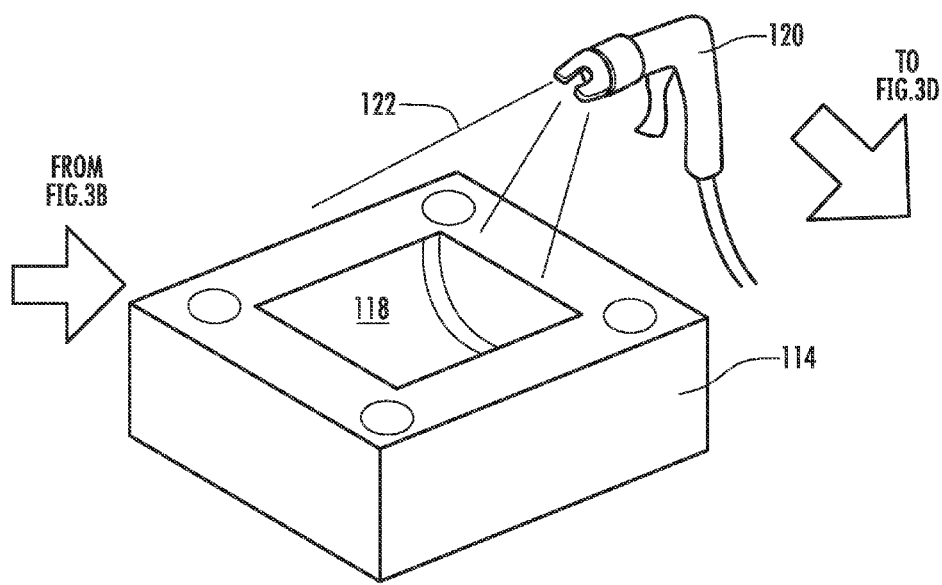
Figure 3D:
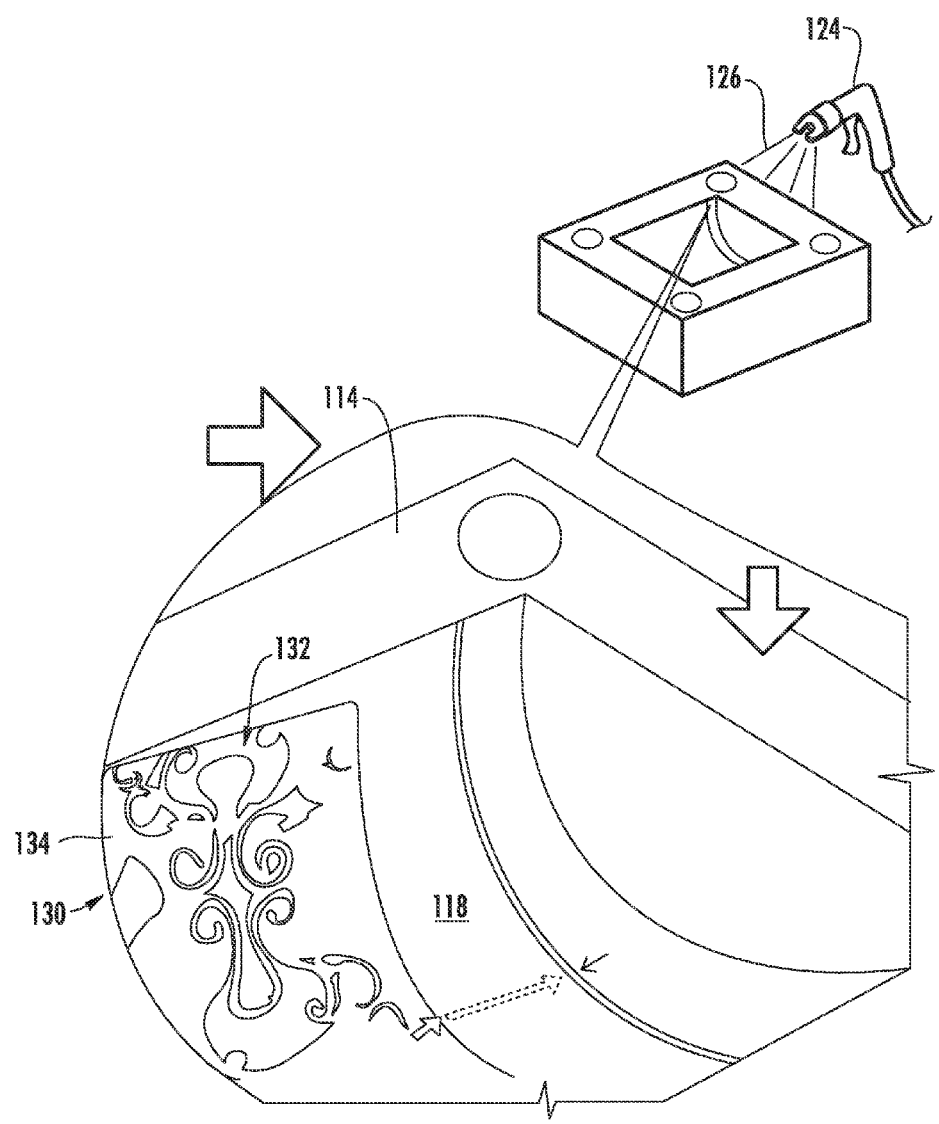
Figure 3E:
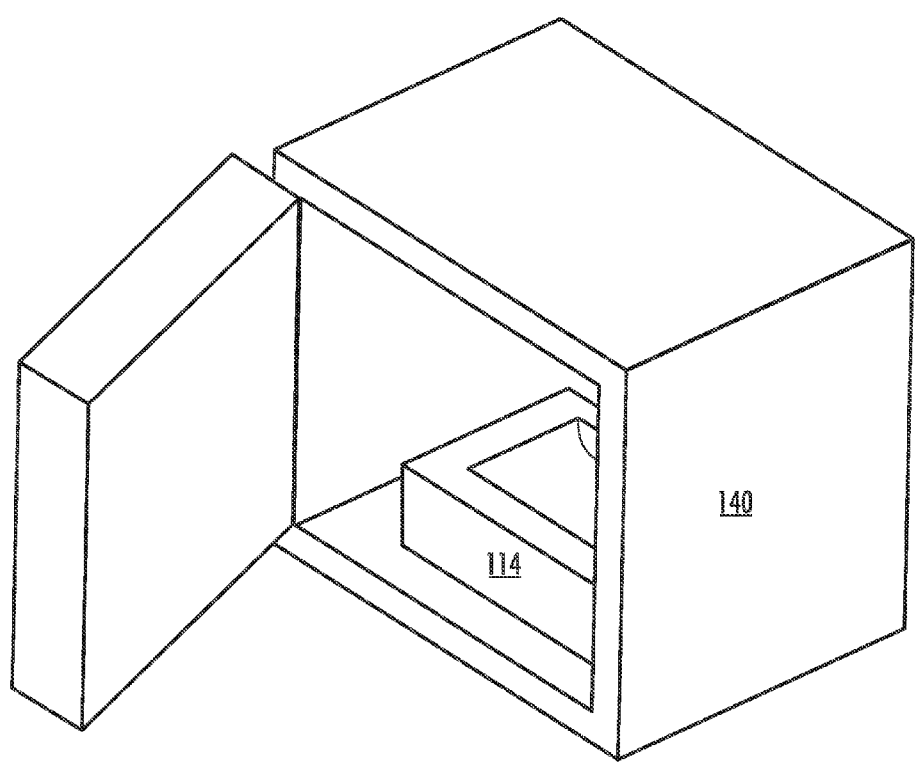
Figure 3F:
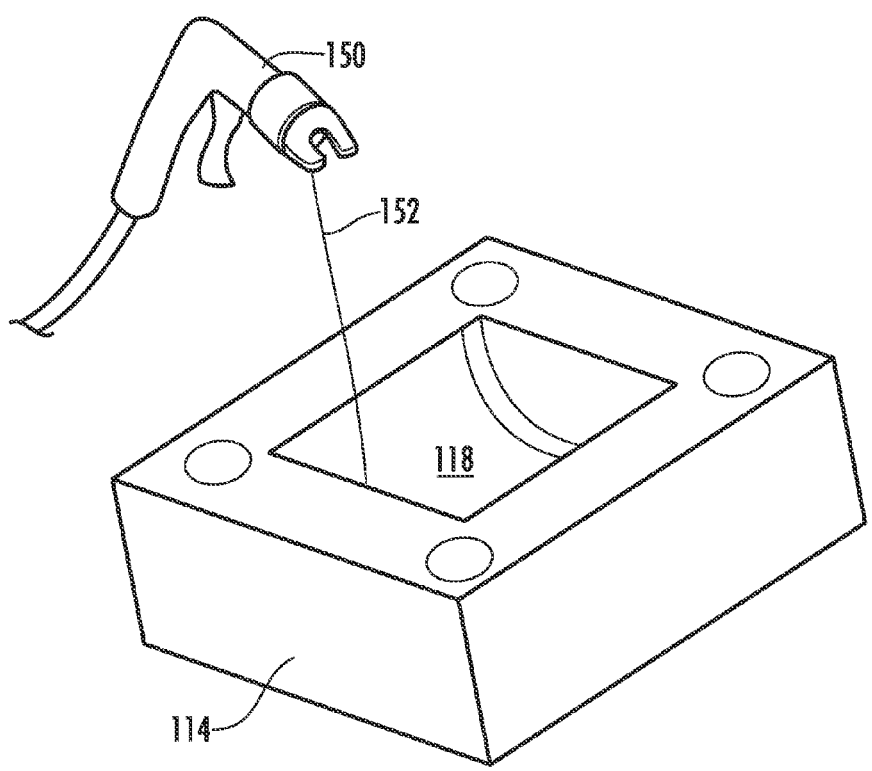

In any event, first, as shown in FIG. 3C, working surface 118 of mold portion 114 is sprayed with a protective chemical 122 via spray gun 120. Next, as shown in FIG. 3D, photosensitive erosion chemical 126 is sprayed on at least a portion of working surface 118 via spray gun 124 (i.e., it is sprayed on the portion of working surface 118 corresponding to the portion of outer surface 102A on which it is desired to form a pattern). Chemical 126 reacts with the metal of metal mold portion 114 only when exposed to certain wavelengths of light, e.g., ultraviolet light. Thereafter, a cover or mask 130 is applied to at least a portion of the sprayed portion of working surface 118. Cover 130 includes at least two regions: a first region 132 that is at least partially light transmissible and thus allows the predetermined wavelength of light to reach working surface 118, and a second region 134 that is substantially opaque and thus does not allow the predetermined wavelength of light to reach working surface 118. As a result, only the portion of working surface 118 beneath first region 132 will be eroded and etched; the portion of working surface 118 beneath second region 134 will remain unaffected. The so-covered mold portion 114 is placed inside oven 140 as shown in FIG. 3E where it is subjected to the relevant wavelength of light, e.g., ultraviolet light, as well as optionally heat. Finally, when the pattern of first region 132 is sufficiently deeply etched into working surface 118, mold portion 114 is removed from oven 140 and sprayed with a cleaning solution 152 from spray gun 150 (see FIG. 3F). Mold portion 114 is then cleaned, and one pattern with at least one layer is now etched into working surface 118.

To achieve the desired pattern as described above, i.e., having different depths, finishes, textures, etc., the process as shown in FIGS. 3C-F is preferably repeated using a different cover 130 having a different pattern. If different depths for the different layers are desired, the degree of etching can be varied for each iteration of the process by using any one or more of the following: different exposure times to the predetermined wavelength of light, so that the longer the exposure, the deeper the etch; different photosensitive chemicals, so that the more reactive the chemical, the deeper the etch; different light transmissibility levels for different covers, so that the more light transmissible the cover, the deeper the etch. Other mechanisms for varying the depth of etch from iteration to iteration are also contemplated.

Optionally, instead of repeating the steps and providing a second cover, a single cover can be used in one step, where light transmissible region 132 is further subdivided into areas having greater and lesser light transmissibility. That way, if the intensity of the light reaching working surface 118 varies significantly from region to region, so too will the depth of the resultant etching.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A counterfeit-resistant, plastic-based toy housing comprising:
   at least one outside wall toy housing surface having a repetitive pattern formed from two distinct geometric shapes, said shapes having two distinct surface textures, further comprising a first region comprised of said first shape with a first of said textures; a second region comprised of said second shape with said second and distinct texture, said surface further comprising said first shape with said second distinct texture and said second shape with said first texture, said second shape with said second texture being confined within the geometric borders of said first shape with said first texture wherein said second shape is completely within the border of said first shape and not crossing over its outer border, and said second shape with said first texture being confined within the geometric border of said first shape with said second texture wherein said second shape with said first texture is also completely within the border of said first shape with said second texture and not crossing over its outer border, said first and said second shapes, of both textures, completely defining and covering a surface area in a tessellation manner.

\* \* \* \* \*